United States Patent
Hashi et al.

(10) Patent No.: US 7,149,059 B2
(45) Date of Patent: Dec. 12, 2006

(54) HEAD SUPPORTING DEVICE AND DISK APPARATUS

(75) Inventors: Hideyuki Hashi, Kadoma (JP); Hideki Kuwajima, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 400 days.

(21) Appl. No.: 10/883,063

(22) Filed: Jun. 30, 2004

(65) Prior Publication Data

US 2005/0018357 A1    Jan. 27, 2005

(30) Foreign Application Priority Data

Jul. 24, 2003    (JP)    ............................ 2003-279266

(51) Int. Cl.
G11B 5/48    (2006.01)

(52) U.S. Cl. .................................. 360/264.2

(58) Field of Classification Search ............ 360/264.2, 360/265.8, 266.1; 29/603.03, 603.04, 603.06
See application file for complete search history.

(56) References Cited

U.S. PATENT DOCUMENTS

| | | | | |
|---|---|---|---|---|
| 5,570,250 A | * | 10/1996 | Casey | 360/265.7 |
| 5,844,754 A | * | 12/1998 | Stefansky et al. | 360/266.1 |
| 5,886,858 A | * | 3/1999 | Yanagihara | 360/264.2 |
| 5,995,322 A | * | 11/1999 | Yanagihara | 360/97.01 |
| 6,781,795 B1 | * | 8/2004 | Abe et al. | 360/264.2 |
| 2005/0195530 A1 | * | 9/2005 | MacPherson | 360/264.2 |

FOREIGN PATENT DOCUMENTS

| | | |
|---|---|---|
| EP | 1 231 598 | 8/2002 |
| JP | 3374846 | 11/2002 |

* cited by examiner

Primary Examiner—Angel Castro
(74) Attorney, Agent, or Firm—Hamre, Schumann, Mueller & Larson, P.C.

(57) ABSTRACT

A head supporting device includes a supporting arm that is swingable in a plane parallel to a recording surface of a recording medium around a first swing axis and in a plane perpendicular to the recording surface of the recording medium around a second swing axis, a head that is attached to one end of the supporting arm so as to be opposed to the recording medium, a holding member that is allowed to swing around the first swing axis in conjunction with a swinging motion of the supporting arm around the first swing axis, and signal wiring that performs signal sending/receiving with respect to the head. The signal wiring is arranged so that from the head, the signal wiring runs through the supporting arm and the holding member in this order and then is connected to an electric circuit. Thus, the attitude of the supporting arm around the second swing axis is not affected by a reaction force generated when the signal wiring is bent due to a swinging motion of the supporting arm around the first swing axis.

10 Claims, 7 Drawing Sheets

HEAD SUPPORTING DEVICE AND DISK
APPARATUS

BACKGROUND OF THE INVENTION

1. Field of the Invention

The present invention relates to a head supporting device and a disk apparatus that include signal wiring for transmitting a signal to be recorded on a recording medium or a signal reproduced from the recording medium.

2. Related Background Art

Japanese Patent No. 3374846 discloses a configuration of a conventional head supporting device and describes the following. That is, the head supporting device includes a supporting arm and a head attached to one end of the supporting arm. The supporting arm is swingable in a plane parallel to a recording surface of a recording medium around a first swing axis and in a plane perpendicular to the recording surface around a second swing axis. The supporting arm is provided with an elastic member that applies a biasing force in a direction in which the head is biased toward the recording medium. By adjusting the balance so that the center of gravity of the supporting arm is positioned in the vicinity of the second swing axis, a head supporting device can be obtained in which vibration due to an impact from the exterior is not likely to be caused, and a stable operation is achieved.

In the above-mentioned head supporting device, it is required that the supporting arm be provided with signal wiring for transmitting a signal to be recorded on the recording medium or a signal reproduced from the recording medium.

However, when the supporting arm is allowed to swing in the plane parallel to the recording surface of the recording medium, a portion of the signal wiring that extends between the supporting arm being allowed to swing and an electric circuit fixed inside a disk apparatus is forced to perform a bending movement. As a result of the bending movement, a reaction force that corresponds to a position to which the supporting arm has been swung is generated from the signal wiring. With respect to the supporting arm, the reaction force resulting from the bending movement of the signal wiring causes a moment to be generated around the first swing axis. Moreover, in the case where the signal wiring is somewhat kinked or shifted in position, the reaction force also causes a moment to be generated around the second swing axis. Because of this, the balance of the supporting arm around the second swing axis is lost, thereby deteriorating the impact resistance. For example, due to an impact from the exterior, the head may scratch the surface of the recording medium.

SUMMARY OF THE INVENTION

It is an object of the present invention to provide a head supporting device and a disk apparatus in which the balance of a supporting arm is not affected adversely by a reaction force resulting from a bending movement of signal wiring, and excellent impact resistance is achieved.

A head supporting device according to the present invention includes a supporting arm that is swingable in a plane parallel to a recording surface of a recording medium around a first swing axis and in a plane perpendicular to the recording surface of the recording medium around a second swing axis, a head that is attached to one end of the supporting arm so as to be opposed to the recording medium, an elastic unit that is provided on the supporting arm so as to bias the head toward the recording surface of the recording medium, a holding member that is allowed to swing around the first swing axis in conjunction with a swinging motion of the supporting arm around the first swing axis, and signal wiring for transmitting a recording signal or a reproduction signal to the head. In the head supporting device, the signal wiring is arranged so that from the head, the signal wiring runs through the supporting arm and the holding member in this order and then is connected to an electric circuit.

A disk apparatus according to the present invention includes a head supporting device that performs signal recording or reproduction with respect to a recording medium, signal wiring for transmitting a signal to be recorded on the recording medium or a signal reproduced from the recording medium, and an electric circuit that generates the signal to be recorded or processes the reproduced signal. In the disk apparatus, the head supporting device includes a supporting arm that is swingable in a plane parallel to a recording surface of the recording medium around a first swing axis and in a plane perpendicular to the recording surface of the recording medium around a second swing axis, a head that is attached to one end of the supporting arm so as to be opposed to the recording medium, an elastic unit that is provided on the supporting arm so as to bias the head toward the recording surface of the recording medium, and a holding member that is allowed to swing around the first swing axis in conjunction with a swinging motion of the supporting arm around the first swing axis. Further, in the disk apparatus, the signal wiring is arranged so that from the head, the signal wiring runs through the supporting arm and the holding member in this order and then is connected to an electric circuit.

DETAILED DESCRIPTION OF THE INVENTION

In the head supporting device according to the present invention, the signal wiring is arranged so that from the head, the signal wiring runs through the supporting arm and the holding member in this order and then is connected to the electric circuit. This allows the holding member to inhibit a phenomenon in which a moment around the second swing axis is exerted on the supporting arm due to a reaction force generated in the signal wiring as a result of a bending movement of the signal wiring that is caused by a swinging motion of the supporting arm around the first swing axis. Thus, the balance of the supporting arm around the second swing axis is not affected adversely.

In the head supporting device, preferably, a portion of the signal wiring that extends between the supporting arm and the holding member is formed in a sheet-like shape.

Preferably, a surface of the signal wiring at the portion that is formed in the sheet-like shape is parallel to the second swing axis.

Preferably, the signal wiring is bent at a portion that runs over the holding member so that a surface of the signal wiring at the portion is perpendicular to the second swing axis.

Preferably, the holding member has bent parts that are formed by bending so as to sandwich the signal wiring.

Preferably, the signal wiring is arranged so as to bridge between the supporting arm and the holding member in the vicinity of the second swing axis.

Preferably, the head supporting device further includes a driving unit that is provided on a side of the other end of the supporting arm so as to allow the supporting arm to swing around the first swing axis.

Preferably, the head supporting device further includes feeding wiring that is provided so as to supply the driving unit with a driving current for allowing the arm to swing.

Preferably, the feeding wiring is arranged so that from the driving unit, the feeding wiring runs through the supporting arm and the holding member in this order and then is connected to the electric circuit.

Hereinafter, the present invention will be described by way of an embodiment with reference to the appended drawings.

Figure 1:
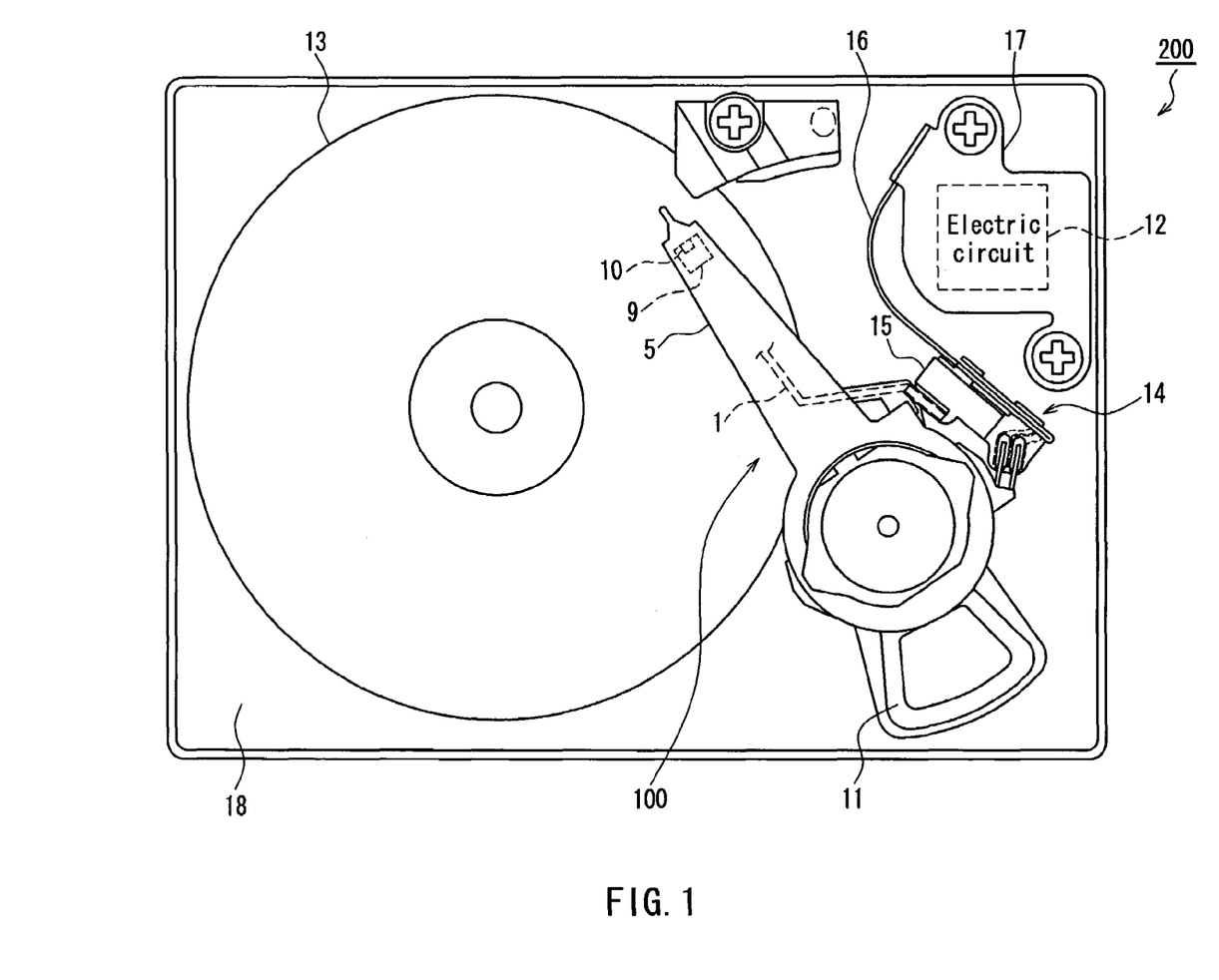
FIG. 1 is a plan view showing a configuration of a disk apparatus according to an embodiment of the present invention.

FIG. 1 is a plan view showing the configuration of a disk apparatus 200 according to an embodiment of the present invention. The disk apparatus 200 carries a substantially disk-shaped recording medium 13 that is provided rotatably in a chassis 18. Ahead supporting device 100 is provided in the chassis 18 of the disk apparatus 200. The head supporting device 100 supports a head 10 for performing signal recording or reproduction with respect to the recording medium 13.

Figure 2:
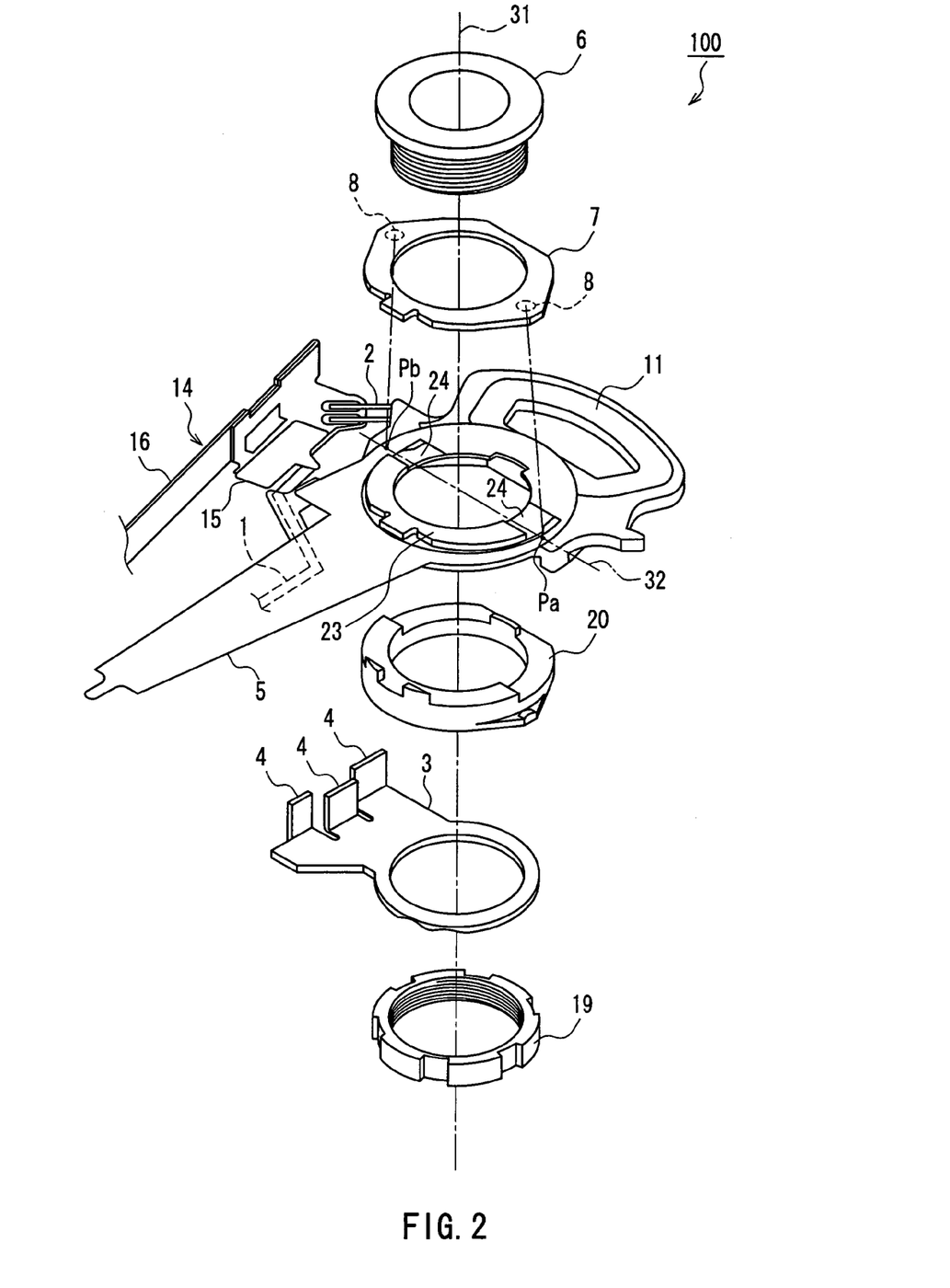
FIG. 2 is an exploded perspective view showing a configuration of a head supporting device provided in the disk apparatus according to the embodiment of the present invention.
Figure 3:
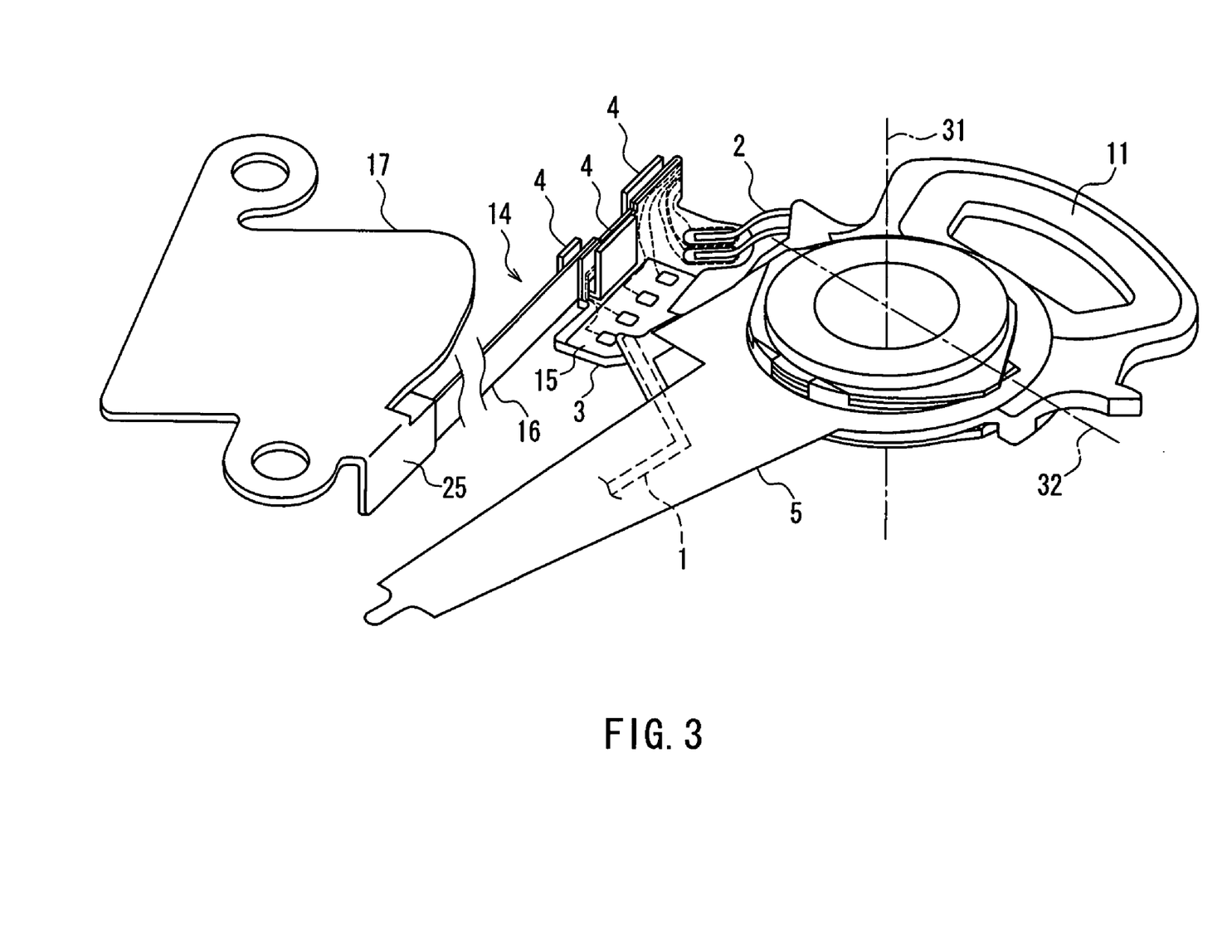
FIG. 3 is a perspective view showing a configuration of signal wiring, a supporting arm, and a holding member that are provided in the head supporting device according to the embodiment of the present invention.
Figure 4:
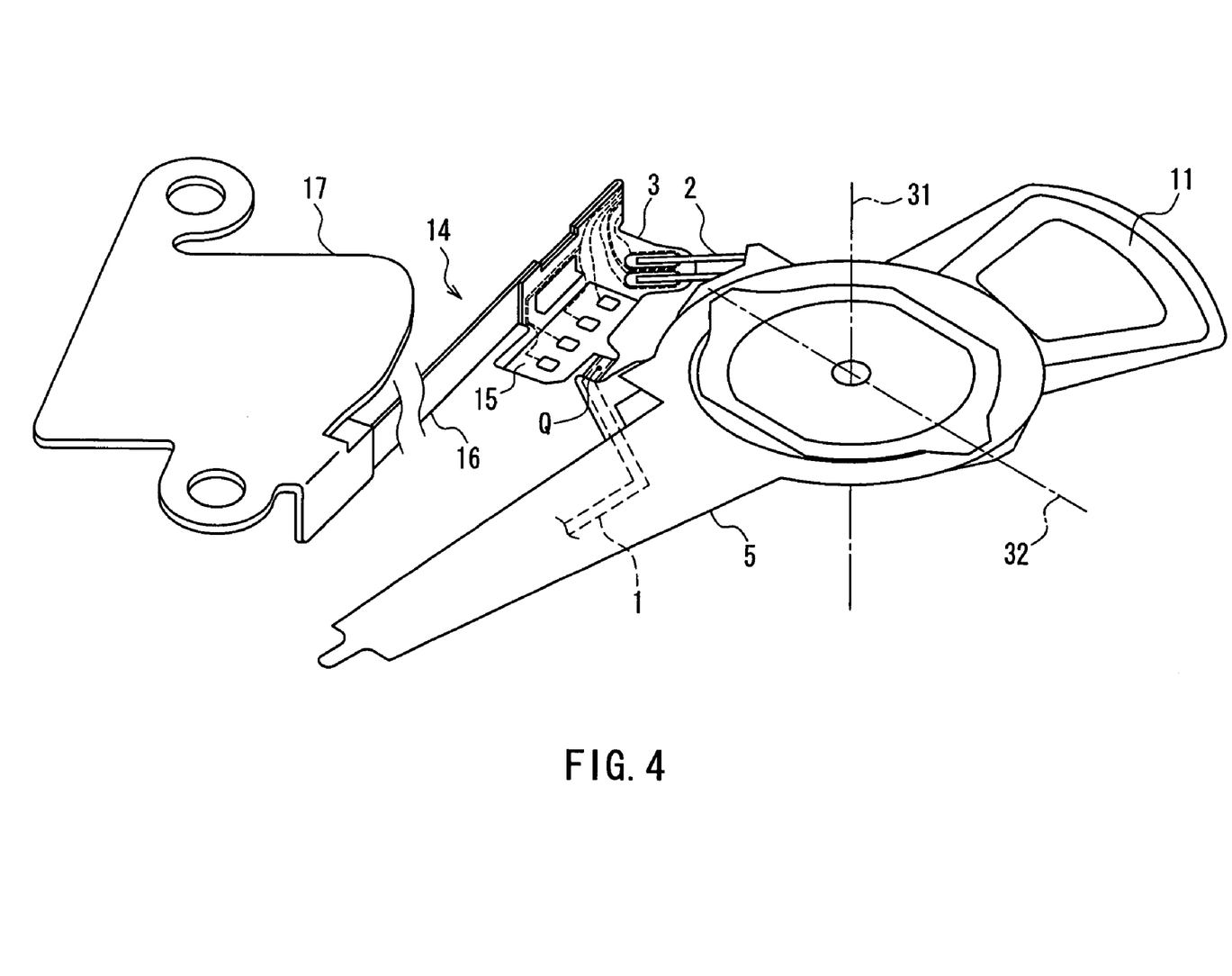
FIG. 4 is a perspective view showing a configuration of the signal wiring and the supporting arm that are provided in the head supporting device according to the embodiment of the present invention.
Figure 5:
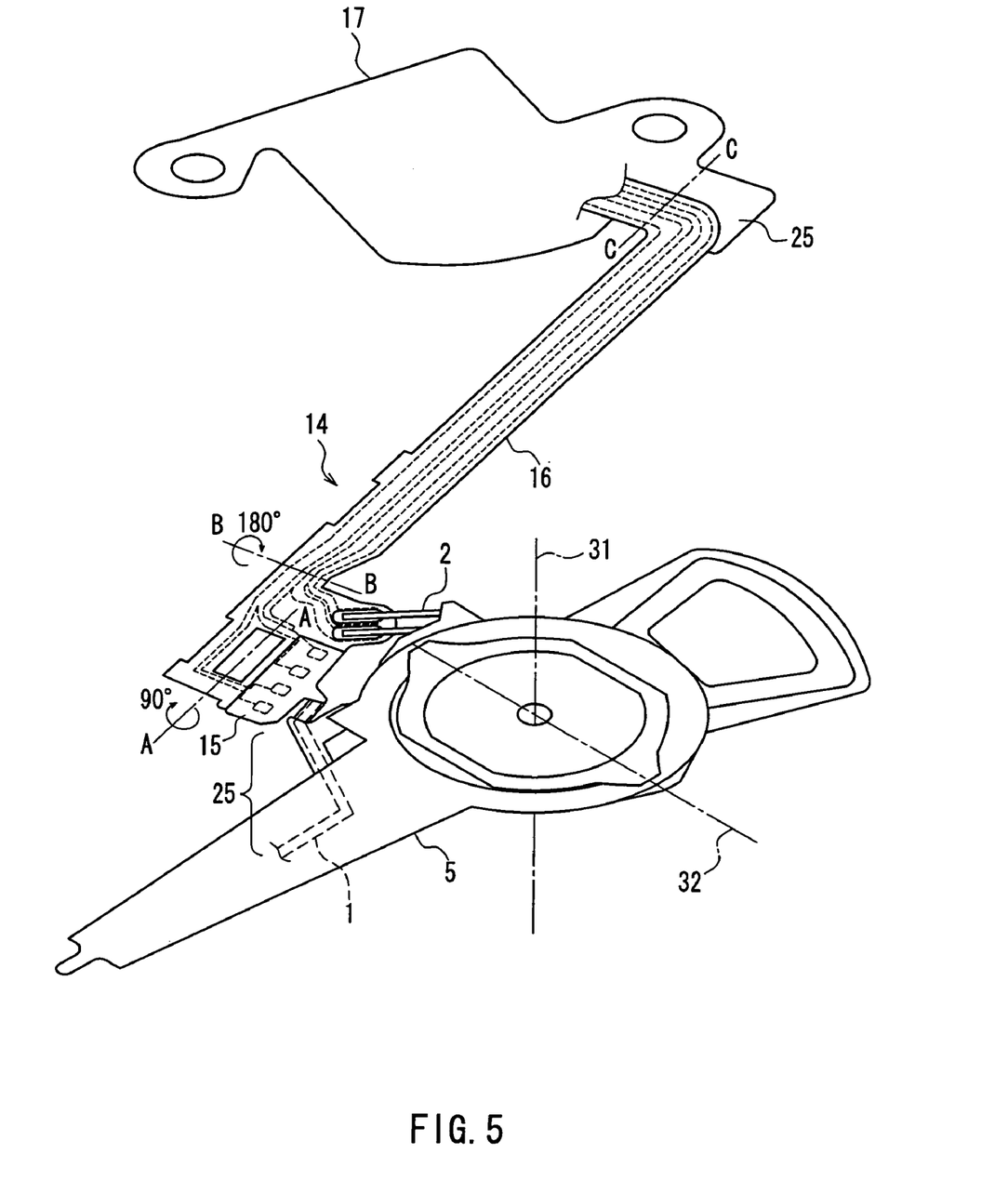
FIG. 5 is a perspective development for explaining a configuration of the signal wiring provided in the head supporting device according to the embodiment of the present invention.

FIG. 2 is an exploded perspective view showing the configuration of the head supporting device 100. FIG. 3 is a perspective view showing the configuration of signal wiring 1, a supporting arm 5, and a holding member 3 that are provided in the head supporting device 100. FIG. 4 is a perspective view showing the configuration of the signal wiring 1 and the supporting arm 5 that are provided in the head supporting device 100. FIG. 5 is a perspective development for explaining the configuration of the signal wiring 1 provided in the head supporting device 100.

The head supporting device 100 includes the supporting arm 5. The supporting arm 5 is swingable in a plane parallel to a recording surface of the recording medium 13 around a first swing axis 31 that is perpendicular to the recording surface of the recording medium 13. The first swing axis 31 passes through the center of a bearing part 6 that is substantially in the shape of a hollow cylinder. Further, the supporting arm 5 is swingable in a plane perpendicular to the recording surface of the recording medium 13 around a second swing axis 32 that is parallel to the recording surface of the recording medium 13. The second swing axis 32 passes through vertex parts 8a and 8b (see FIG. 6 that will be described later) of a pair of protrusions 8 that are provided on a pivot bearing 7. The pivot bearing 7 is substantially in the shape of a hollow disk. The pair of protrusions 8 defining the second swing axis 32 may be of a hemispherical shape or a conical shape. Alternatively, the pair of protrusions 8 may be in the form of ridges that are arranged so that the longitudinal direction thereof is parallel to the second swing axis 32 and include the vertex parts 8a and 8b that have a cross section of a wedge shape or a circular arc shape.

The head 10 is held by a slider 9, which is provided at one end of the supporting arm 5, so as to be opposed to the recording medium 13. When the supporting arm 5 is allowed to swing in the plane parallel to the recording surface of the recording medium 13 around the first swing axis 31, the head 10 is allowed to move substantially along one radial direction of the recording medium 13.

A member 20 that is substantially in the shape of a hollow cylinder is provided so as to be opposed to the pivot bearing 7 through the supporting arm 5. Further, the holding member 3 that is substantially in the shape of a hollow disk is provided so as to be opposed to the pivot bearing 7 through the member 20 and the supporting arm 5.

Furthermore, a nut 19 is provided so as to be opposed to the bearing part 6 through the pivot bearing 7, the supporting arm 5, the member 20, and the holding member 3. A male thread is formed in the bearing part 6, and a female thread is formed in the nut 19. The male thread formed in the bearing part 6 is screwed into the female thread formed in the nut 19, and thus the bearing part 6, the pivot bearing 7, the supporting arm 5, the member 20, the holding member 3, and the nut 19 are assembled into one unit. This allows the holding member 3 to swing in the plane parallel to the recording surface of the recording medium 13 around the first swing axis 31 in conjunction with a swinging motion of the supporting arm 5 around the first swing axis 31.

The head supporting device 100 is provided with the signal wiring 1. The signal wiring 1 transmits a signal to be recorded on the recording medium 13 or a signal reproduced from the recording medium 13 across a path between the head 10 and an electric circuit 12. The electric circuit 12 is provided in a fixed part 17 that is provided in the chassis 18. The signal wiring 1 is arranged so that from the head 10, the signal wiring 1 runs through the supporting arm 5 and the holding member 3 in this order and then is connected to the electric circuit 12.

In order to enable easy deformation by bending, a portion Q of the signal wiring 1 that extends between the supporting arm 5 and the holding member 3 as shown in FIG. 4 is formed in a sheet-like shape. The surface of the signal wiring 1 at the portion Q that is formed in the sheet-like shape is virtually parallel to the surface of the supporting arm 5, i.e. parallel to the second swing axis 32. The signal wiring 1 is arranged so as to bridge between the supporting arm 5 and the holding member 3 in the vicinity of the pair of protrusions 8 (namely, the second swing axis 32). This suppresses to a minimal level a phenomenon in which a reaction force attributable to the rigidity of the signal wiring 1 is exerted on the supporting arm 5 when the supporting arm 5 is allowed to swing around the second swing axis 32.

The signal wiring 1 led from the electric circuit 12 is held by a flexible board 14 having flexibility and connected to another signal wiring 1 led from the supporting arm 5 at a lead-out terminal part 15 provided on the flexible board 14 using a conductive adhesive by a known method.

On the holding member 3, the flexible board 14 on which the signal wiring 1 is formed is bent upward on one end by an angle of about 90 degrees along line A—A shown in FIG. 5 so that its surface is virtually perpendicular to the surface of the supporting arm 5 (i.e. so that the surface of the flexible board 14 is perpendicular to the second swing axis 32). The one end of the flexible board 14 further is bent at an angle of 180 degrees along line B—B shown in FIG. 5. The other end of the flexible board 14 is fixed to a flexure portion 25 that is provided in the fixed part 17. The flexure portion 25 is bent at an angle of 90 degrees along line C—C shown in FIG. 5. As a result, the flexible board 14 has the bent shape shown in FIGS. 2, 3 and 4.

In the above-mentioned manner, the flexible board 14 constitutes a movable arch part 16 that extends between the lead-out terminal part 15 and the fixed part 17. The movable arch part 16 can be distorted freely so as to correspond to a swinging motion of the supporting arm 5 around the first swing axis 31.

The holding member 3 has bent parts 4 that are formed by bending parallel to the first swing axis so as to sandwich the flexible board 14 on which the signal wiring 1 is formed. One end of the movable arch part 16 of the flexible board 14 is sandwiched between the bent parts 4. This allows the holding member 3 to inhibit a phenomenon in which a moment around the second swing axis 32 is exerted on the supporting arm 5 due to a reaction force generated in the movable arch part 16 when the supporting arm 5 is allowed to swing around the first swing axis 31. Thus, the balance (attitude) of the supporting arm 5 around the second swing axis 32 is not affected adversely.

The head supporting device 100 is provided with a voice coil motor 11. In order to allow the supporting arm 5 to swing around-the first swing axis 31, the voice coil motor 11 is provided at the side of the other end of the supporting arm 5 that is opposed to the side of the head 10 with respect to the first swing axis 31. The head supporting device 100 includes feeding wiring 2 that is provided so as to supply the voice coil motor 11 with a driving current for allowing the supporting arm 5 to swing around the first swing axis 31. The feeding wiring 2 is arranged so that from the voice coil motor 11, the feeding wiring 2 runs through the supporting arm 5, the holding member 3, and the flexible board 14 in this order and then is connected to the electric circuit 12.

Herein, the operating principle of the supporting arm 5 is described in detail with reference to FIGS. 2, 6 and 7.

Figure 6:
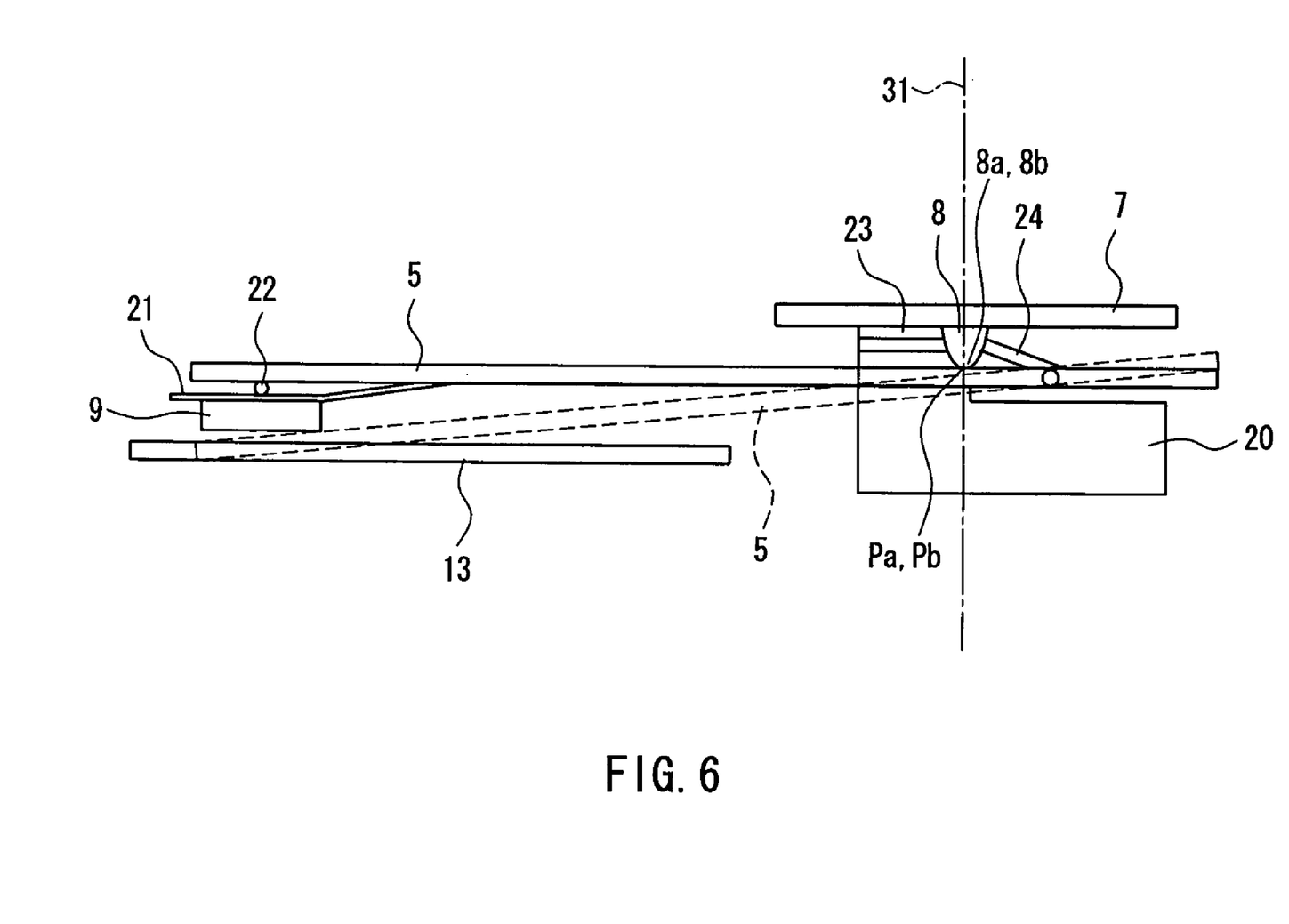
FIG. 6 is a side view illustrating an operating principle of the head supporting device according to the embodiment of the present invention.
Figure 7:
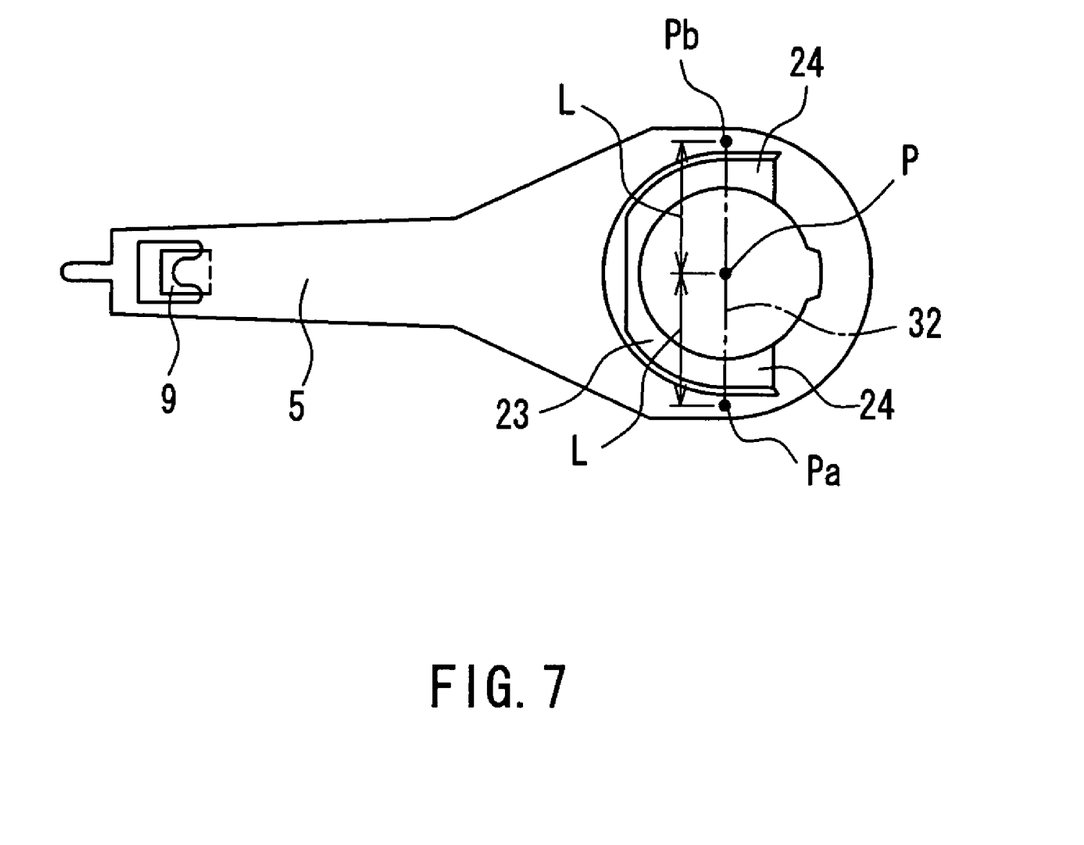
FIG. 7 is a plan view illustrating the operating principle of the head supporting device according to the embodiment of the present invention.

FIG. 6 is a side view schematically showing a configuration of a head supporting device for illustrating the operating principle of the head supporting device according to the present invention, and FIG. 7 is a plan view schematically showing the configuration.

As shown in FIG. 2, a pair of leaf spring parts 24 as elastic units and a spring fixing member 23 that is cantilevered through the leaf spring parts 24 are formed on the supporting arm 5 in the vicinity of the first swing axis 31. The spring fixing member 23 is fixed by being sandwiched between the pivot bearing 7 and the member 20. Thus, the supporting arm 5 is held elastically through the leaf spring parts 24 with respect to the pivot bearing 7 and the member 20.

At this time, the vertex parts 8a and 8b of the pair of protrusions 8 that are provided on the surface of the pivot bearing 7 on a side opposed to the supporting arm 5 come in contact with the supporting arm 5 at points Pa and Pb, respectively, which are shown in FIG. 7. By the pair of protrusions 8, the leaf spring parts 24 are deformed elastically so that the supporting arm 5 is placed in the attitude shown by the dotted line in FIG. 6.

In the case where the recording medium 13 is started to rotate for recording/reproduction, the leaf spring parts 24 are deformed elastically so as to allow the slider 9 to float up. When the supporting arm 5 is in the state shown by the solid line in FIG. 6, i.e. in the state where a predetermined gap is maintained between a magnetic head provided in the slider 9 and the magnetic recording medium 13, recording or reproduction is performed. In this case, a reaction force of the leaf spring parts 24 that acts to return the supporting arm 5 to the state shown by the dotted line in FIG. 6 is used as a pressure load to be applied to the slider 9.

The second swing axis 32 is a center around which the supporting arm 5 is allowed to swing in directions in which the slider 9 is brought in/out of contact with the recording medium 13. The second swing axis 32 passes through points Pa and Pb on the supporting arm 5, which come into contact with the vertex parts 8a and 8b of the pair of protrusions 8 of the pivot bearing 7, respectively. Further, the first swing axis 31 is a center around which the supporting arm 5 is allowed to swing in the plane parallel to the recording surface of the recording medium 13 so that a tracking operation is performed. The first swing axis 31 orthogonally intersects the second swing axis 32 at point P. A length between point P and point Pa and a length between point P and point Pb, which are both denoted L, are equal to each other. Further, the second swing axis 32 is perpendicular to the longitudinal direction of the supporting arm 5.

With the above-mentioned configuration of the head supporting device, a portion of the supporting arm 5 other than the leaf spring parts 24 can be formed of a material having high rigidity. Particularly, an area of the supporting arm 5 that extends from points Pa and Pb to a point to which the slider 9 is attached (hereinafter, this area of the supporting arm 5 is referred to as an "arm main part") can be formed entirely of a material having high rigidity.

In the case where the arm main part of the supporting arm 5 is formed of a highly rigid material as describe above, the resonance frequency of the supporting arm 5 can be increased, and thus a vibration mode is not caused, thereby eliminating the need for a time required to settle vibration. Therefore, a high-speed swinging motion and positioning of the supporting arm 5 are enabled, thereby allowing a magnetic recording/reproducing apparatus to have an increased access speed.

Furthermore, the leaf spring parts 24 as the elastic units are not incorporated into the arm main part but are provided independently of the arm main part. Therefore, while the rigidity of the arm main part is secured, by changing the thickness, a material or the like of the leaf spring parts 24, the strength and a spring constant of the leaf spring parts 24 can be selected. Thus, a pressure load to be applied to the slider 9 can be set optimally.

Furthermore, preferably, in the state of use of the head supporting device in which the slider 9 has floated up from the recording medium 13, the center of gravity of the supporting arm 5, which is held by means of the pair of protrusions 8 and the leaf spring parts 24 and to which the voice coil 11 and a coil holder for the voice coil 11 are attached, is positioned so as to coincide with point P where the first swing axis 31 and the second swing axis 32 intersect each other. Thus, a head supporting device can be provided in which vibration due to, for example, an impact from the exterior is not likely to be caused, and a stable operation is achieved. As described above, the swinging motion of the supporting arm 5 in the directions in which the slider 9 is bought in/out of contact with the recording medium 13 is balanced with respect to the vertex parts 8a and 8b of the pair of protrusions 8 as fulcrums. This allows a head supporting device that has excellent impact resistance to be provided.

The effect of obtaining the impact resistance is attained more reliably by the configuration described in this embodiment in which the holding member 3 is used to hold the signal wiring 1. That is, the signal wiring 1 is sandwiched between the bent parts 4 that are provided on the holding member 3 so as to be perpendicular to the second swing axis 32. This reliably inhibits a phenomenon in which a moment around the second swing axis 32 is exerted on the supporting arm 5 due to a reaction force resulting from distortion of the movable arch part 16 that is caused when the supporting arm 5 is allowed to swing around the first swing axis 31. Thus, the balance of the supporting arm 5 around the second swing axis 32 is not affected adversely.

Moreover, the effect of obtaining the impact resistance is attained more reliably by the following configurations: a portion of the signal wiring 1 that extends between the supporting arm 5 and the holding member 3, namely, the portion Q shown in FIG. 4, is formed in a sheet-like shape; the portion that is formed in the sheet-like shape is set so as to be virtually parallel to the surface of the supporting arm 5 (i.e. parallel to the second swing axis 32); and the signal wiring 1 is arranged so as to bridge between the supporting arm 5 and the holding member 3 in the vicinity of the pair of protrusions 8 (namely, the second swing axis 32). This is because by these configurations, a reaction force resulting from the bending of the portion Q of the signal wiring 1 shown in FIG. 4, which is caused when the supporting arm 5 is allowed to swing around the second swing axis 32, can be suppressed to a low level. That is, regardless of the position to which the supporting arm 5 has been swung around the second swing axis 32, in other words, regardless of whether or not the slider 9 is in contact with the recording medium 13, a moment around the second swing axis 32 that is imparted to the supporting arm 5 by the signal wiring 1 can be suppressed to a minimal level, and thus the balance of the supporting arm 5 around the second swing axis 32 is not affected adversely.

Needless to say, a particular effect of reducing variations in pressure load (a force biasing the slider 9 toward the recording medium 13) also can be attained by: using a structure in which the signal wiring 1 is held by the holding member 3; forming a portion of the signal wiring 1 that extends between the supporting arm 5 and the holding member 3 in a sheet-like shape; setting the portion that is formed in the sheet-like shape so that the portion is virtually parallel to the surface of the supporting arm 5; and arranging the signal wiring 1 so that the signal wiring 1 bridges between the supporting arm 5 and the holding member 3 in the vicinity of the pair of protrusions 8.

Furthermore, the holding member 3 is used to hold the signal wiring 1, and thus the mass of a portion of the signal wiring 1 that is held by the holding member 3 is not applied to the supporting arm 5. This allows the mass of the supporting arm 5 to be suppressed to an extremely small value. Thus, the resonance frequency of the supporting arm 5 can be increased, thereby also attaining the effect of increasing impact resistance.

As described in the foregoing discussion, according to this embodiment, the signal wiring 1 is arranged so that from the head 10, the signal wiring 1 runs through the supporting arm 5 and the holding member 3 in this order and then is connected to the electric circuit 12. Thus, a head supporting device and a disk apparatus can be provided in which the balance of the supporting arm 5 around the second swing axis 32 is not affected adversely by a reaction force resulting from a bending movement of the signal wiring 1 that is caused by a swinging motion of the supporting arm 5 around the first swing axis 31, and excellent impact resistance is achieved.

The head supporting device according to the present invention is applicable to magnetic recording/reproducing apparatuses using a magnetic head and a disk recording/reproducing apparatuses of a non-contact type such as, for example, an optical disk apparatus, a magneto-optical disk apparatus and the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A head supporting device, comprising:
    a supporting arm that is swingable in a plane parallel to a recording surface of a recording medium around a first swing axis and in a plane perpendicular to the recording surface of the recording medium around a second swing axis;
    a head that is attached to one end of the supporting arm so as to be opposed to the recording medium;
    an elastic unit that is provided on the supporting arm so as to bias the head toward the recording surface of the recording medium;
    a holding member that is allowed to swing around the first swing axis in conjunction with a swinging motion of the supporting arm around the first swing axis; and
    signal wiring for transmitting a recording signal or a reproduction signal to the head,
    wherein the signal wiring is arranged so that from the head, the signal wiring runs through the supporting arm and the holding member in this order and then is connected to an electric circuit.

2. The head supporting device according to claim 1, wherein a portion of the signal wiring that extends between the supporting arm and the holding member is formed in a sheet-like shape.

3. The head supporting device according to claim 2, wherein a surface of the signal wiring at the portion that is formed in the sheet-like shape is parallel to the second swing axis.

4. The head supporting device according to claim 1, wherein the signal wiring is bent at a portion that runs over the holding member so that a surface of the signal wiring at the portion is perpendicular to the second swing axis.

5. The head supporting device according to claim 1, wherein the holding member has bent parts that are formed by bending so as to sandwich the signal wiring.

6. The head supporting device according to claim 1, wherein the signal wiring is arranged so as to bridge between the supporting arm and the holding member in the vicinity of the second swing axis.

7. The head supporting device according to claim 1, further comprising a driving unit that is provided on a side of the other end of the supporting arm so as to allow the supporting arm to swing around the first swing axis.

8. The head supporting device according to claim 7, further comprising feeding wiring that is provided so as to supply the driving unit with a driving current for allowing the supporting arm to swing.

9. The head supporting device according to claim 8, wherein the feeding wiring is arranged so that from the driving unit, the feeding wiring runs through the supporting arm and the holding member in this order and then is connected to the electric circuit.

10. A disk apparatus, comprising:

a head supporting device that performs signal recording or reproduction with respect to a recording medium;

signal wiring for transmitting a signal to be recorded on the recording medium or a signal reproduced from the recording medium; and an electric circuit that generates the signal to be recorded or processes the reproduced signal, wherein the head supporting device comprises:

a supporting arm that is swingable in a plane parallel to a recording surface of the recording medium around a first swing axis and in a plane perpendicular to the recording surface of the recording medium around a second swing axis;

a head that is attached to one end of the supporting arm so as to be opposed to the recording medium;

an elastic unit that is provided on the supporting arm so as to bias the head toward the recording surface of the recording medium; and a holding member that is allowed to swing around the first swing axis in conjunction with a swinging motion of the supporting arm around the first swing axis, and the signal wiring is arranged so that from the head, the signal wiring runs through the supporting arm and the holding member in this order and then is connected to an electric circuit.

* * * * *